United States Patent [19]

Brule et al.

[11] Patent Number: 4,937,853

[45] Date of Patent: Jun. 26, 1990

[54] LOTTERY AGENT DATA COMMUNICATION/TELEPHONE LINE INTERFACE

[75] Inventors: Jean D. Brule, Columbus, Ohio; David C. Young, Waconia, Minn.

[73] Assignee: AGT International, Inc., Columbus, Ohio

[21] Appl. No.: 347,151

[22] Filed: May 3, 1989

[51] Int. Cl.$^5$ .......................................... H04M 11/00
[52] U.S. Cl. ........................................ 379/96; 379/97; 364/412
[58] Field of Search ................. 379/91, 92, 96, 97, 379/355; 902/23; 364/412

[56] References Cited

U.S. PATENT DOCUMENTS

| | | | |
|---|---|---|---|
| 3,821,705 | 6/1974 | Chertok et al. | 379/91 X |
| 4,355,372 | 10/1982 | Johnson et al. | 379/92 |
| 4,373,726 | 2/1983 | Churchill et al. | 902/23 X |
| 4,494,197 | 1/1985 | Troy et al. | 364/412 |
| 4,535,204 | 8/1985 | Hughes et al. | 379/355 |
| 4,575,625 | 3/1986 | Knowles | 235/467 |
| 4,577,061 | 3/1986 | Katzeff et al. | |
| 4,587,379 | 5/1986 | Masuda | |
| 4,654,482 | 3/1987 | DeAngelis | 379/91 X |
| 4,672,377 | 6/1987 | Murphy et al. | 340/825.34 |
| 4,689,742 | 8/1987 | Troy et al. | 364/412 |
| 4,725,079 | 2/1988 | Koza et al. | 283/73 |
| 4,750,201 | 6/1988 | Hodgson et al. | 379/144 |
| 4,760,247 | 7/1988 | Keane et al. | 364/412 X |
| 4,799,254 | 1/1989 | Dayton et al. | 379/97 |
| 4,817,136 | 3/1989 | Rhoads | 379/91 X |
| 4,832,341 | 5/1989 | Muller et al. | 273/139 |
| 4,850,009 | 7/1989 | Zook et al. | 379/96 |

FOREIGN PATENT DOCUMENTS

| | | | |
|---|---|---|---|
| 1162336 | 2/1984 | Canada | 364/412 |
| 63-275250 | 11/1988 | Japan . | |
| 63-299445 | 12/1988 | Japan | 379/102 |
| 2101843 | 1/1983 | United Kingdom | 379/96 |

Primary Examiner—Keith E. George
Attorney, Agent, or Firm—Killworth, Gottman, Hagan & Schaeff

[57] ABSTRACT

A data transmission system for interfacing with a telephone communication line includes a bar code reader and a hand-held bar code scanning device for reading bar coded information, such as a lottery ticket number, and generating electrical signals representative thereof. The system also includes a program-storing memory and a processor for converting the electrical signals to a format recognizable by a telephone system, i.e. dial pulses or dual tone signals. A display is provided for displaying the electrical signals. A telephone network interface is employed to transmit the telephone system recognizable signals to the telephone line.

6 Claims, 3 Drawing Sheets

LOTTERY AGENT DATA COMMUNICATION/TELEPHONE LINE INTERFACE

BACKGROUND OF THE INVENTION

The present invention relates generally to the field of entering data into a computerized system by standard telephone signals and, more particularly, to a data transmission system for reading and converting bar coded alphanumeric characters into standard telephone system signals.

It is a common practice for persons to input information into computerized systems, such as voice response systems used for many commercial applications, by pressing keys on a tone signaling telephone. This practice has been employed, for example, by lottery ticket sales agents in many state-sponsored instant lottery systems in the United States. In such systems, a player can find out immediately after purchase of a ticket whether his or her ticket number is a winner. For immediate validation of an apparently winning instant lottery ticket, an interactive call processing network is used by the ticket sales agent for identification of the agent and verification of the instant lottery ticket number such that the agent can make payment to the holder of a winning ticket on-the-spot or "instantly".

A major drawback of this practice is that information has to be manually entered into the interactive call network to obtain ticket validation. In other words, ticket sales agents have to manually key in the data to find out whether a ticket number is a winner entitled to receive immediate payment. Manual entry is error-prone and time-consuming, thus providing a source of public dissatisfaction and a bottleneck for instant lottery systems.

Consequently, a need exists for an alternative approach to instant lottery ticket verification which will avoid the drawback and potentially deleterious effects of the current practice on the popularity of instant lottery systems.

SUMMARY OF THE INVENTION

The above-described drawback of the current practice is eliminated and the aforementioned need is satisfied by the provision of the data transmission system of the present invention. The necessity of manually keying in data is avoided by the data transmission system of the present invention. Instead, the system reads and converts (or translates) alphanumeric characters in bar code form, such as those provided on instant lottery tickets, to electrical signals which are in turn converted to standard telephone signals. Standard telephone signals as used herein will refer to dial pulses, dual tone telephone generated signals (often referred to under the AT&T trademark as "Touch Tone" signals) and/or dual tone multifrequency (DTMF) signals, all of which are received and recognized by conventional telephone systems. Alphanumeric characters can be sent faster and more accurately by reading a bar code representative thereof than by entering them manually on a keypad. The automated approach of the present invention is thus both faster and more accurate than entering numbers manually by pressing signaling keys on a keypad.

Thus, the present invention is directed to a data transmission system for interfacing with a telephone communication line. The data transmission system comprises: (a) mean for reading bar coded information and generating electrical signals representative thereof; (b) means responsive to the reading means for converting the signals to standard telephone signals; and (c) means responsive to the converting means for transmitting the telephone recognizable signals to the telephone communication line.

More particularly, the reading means includes a bar code reader, and a bar code scanning device connected to the reader. Preferably, the scanning device is a hand-held bar code scanning wand although other scanning devices can be used.

Further, the converting means includes a memory for storing an application program containing routines executable for encoding the electrical signals and converting the signals to a standard communications format recognizable by telephone systems. The converting means also includes a processor for receiving the electrical signals from the reading means and accessing the memory for causing execution of the application program for encoding the electrical signals and converting them to the telephone-recognizable signals.

Still further, the transmitting means includes a pulse generator responsive to the converting means for causing transmission of the standard telephone signals as dial pulses to the telephone communication line. Also, the transmitting means includes a tone generator responsive to the converting means for causing transmission of the standard telephone signals as tones to the telephone communication line. i.e. dual tone signals.

Accordingly, it is an object of the present invention to provide a data transmission system capable of automating any system which expects to receive standard dual tone signals over a telephone line; to provide a data transmission system which reads and converts bar coded numbers into dual tone or dial pulse signals recognized by conventional telephone systems and networks; to provide a data transmission system which automates existing instant lottery systems; to provide a data transmission system which reduces user waiting time and eliminates the opportunity for operator error; and, to provide a data transmission system which uses a retail product identification medium, e.g., a bar code label, as the identification symbology of lottery ticket numbers, of agent passcodes and other services.

DETAILED DESCRIPTION OF THE PREFERRED EMBODIMENT

Introduction

Figure 1:
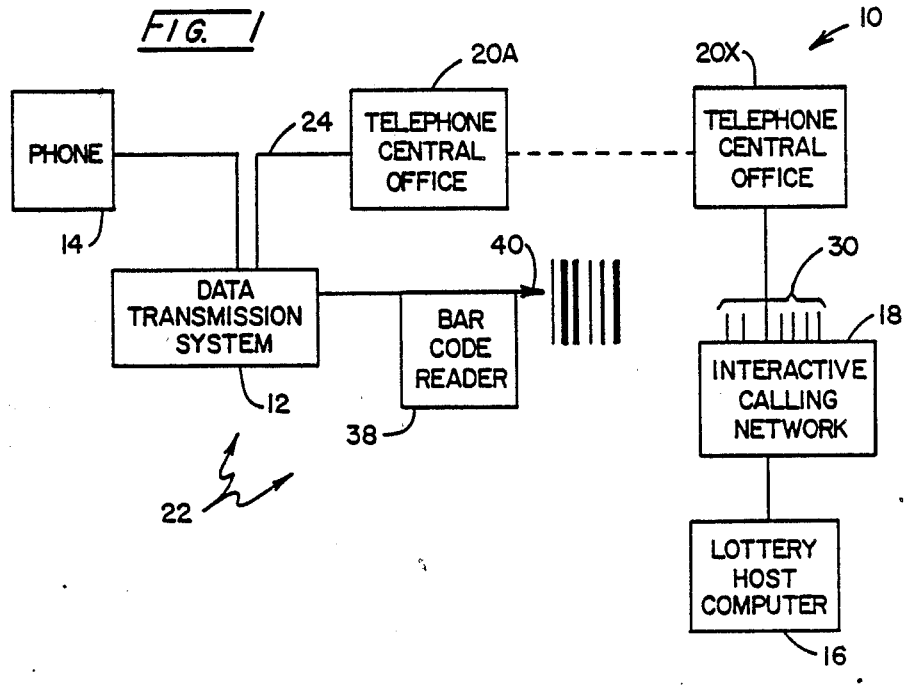
FIG. 1 is a block diagram of a network supporting an instant lottery system which employs the data transmission system of the present invention for interface with a host computer of the instant lottery system via an interactive telephone calling network and a telephone central office;.

While the present invention is generally applicable to reading and converting bar coded information into standard telephone signals, it will be described with reference to an instant lottery system for which it is particularly applicable and has been reduced to practice. Reference is now made to FIG. 1 of the drawings which illustrates, in block diagram form, a network, generally designated 10, for supporting an instant lottery system. The network 10 employs a data transmission system 12 in accordance with the present invention. The system 12 interfaces with a lottery host computer 16 of the instant lottery system via the network 10. The lottery host computer 16 is interfaced with the data transmission system 12 via an interactive telephone calling network 18 and one or more telephone central offices 20A–20X.

Figure 2:
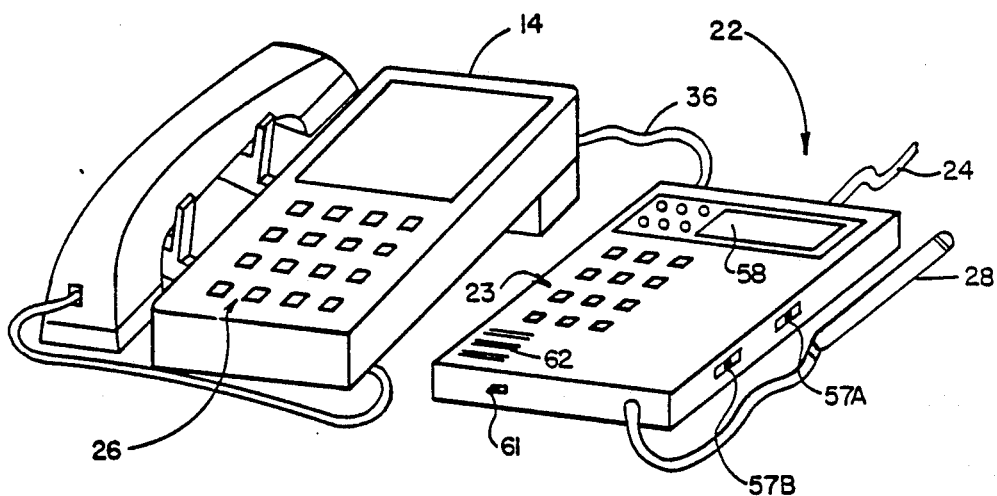
FIG. 2 is a perspective view of a conventional telephone and the data transmission system of the present invention interfaced with an incoming telephone line.

In FIG. 2, a conventional telephone 14 and a telephonic bar code interface 22 are shown. The telephonic bar code interface 22 contains the data transmission system 12 of the present invention and is interfaced with a telephone line 24. The telephone 14 contains a keypad 26 and the interface 22 is connected with a conventional bar code reader wand 28 as shown although it is to be understood that other scanners can be used in the present invention, for example point-of-sale scanners which are commonly incorporated into checkout counters.

The telephone 14 is connected to the telephone bar code interface 22 and the telephone line 24 via a parallel connection in the telephonic bar code reader 22 and a modular jack (not shown) as is common in telephonic equipment. While the telephonic bar code interface 22 can be used a as stand alone unit and hence includes a keypad 23, interconnection of the telephone 14 permits oral communication within the system and permits signaling via the telephone key pad 26 which may be more convenient and/or preferred in some applications.

Overview of Instant Lottery System Support Network

The interactive calling network 18 of the network 10 sends voice messages and receives standard telephone generated dual tone signals. For purposes of brevity and clarity, the use of the term "dual tone" signals hereinafter means either dual tone telephone signals (Touch Tone) or DTMF signals.

Separate telephone lines 30 are connected to the interactive calling network 18 from one of the telephone central offices 20 in order for the instant lottery system via its host computer 16 to provide services to the lottery's retail agents. When an agent calls one of these telephone lines 30, the agent is asked to enter the agent number and passcode. After the network 18 receives these, it sends a voice menu so that the agent can select the service desired. Typical lottery retail agent services include validation of winning instant lottery tickets, agent ordering of materials, and invoice confirmation. For example, for winning instant lottery ticket validation the agent must enter the ticket number and ticket validation number. For invoice confirmation the agent must enter the invoice number.

By use of the data transmission system 12, the lottery's retail sales clerk responding to the voice messages from the interactive calling network 18 does not have to key in these numbers on the keypad 23 of the telephonic bar code interface 22 or the keypad 26 of the telephone 14, if provided. Instead, the data transmission system 12 reads bar codes and converts the bar coded information to dual tone signals, sending them over the telephone line 24 through one or more telephone central offices 20A–20X. The data transmission system 12 also provides for converting a bar coded phone number to dial pulses in the case of a telephone line not equipped for dual tone dialing. Thus, in response to a voice message request from the interactive calling network 18, the agent can "swipe" the bar code reader wand 28 across an appropriate bar code to respond, both for entering information and dialing a call via the data transmission system 12.

Data Transmission System of Present Invention

Figure 3:
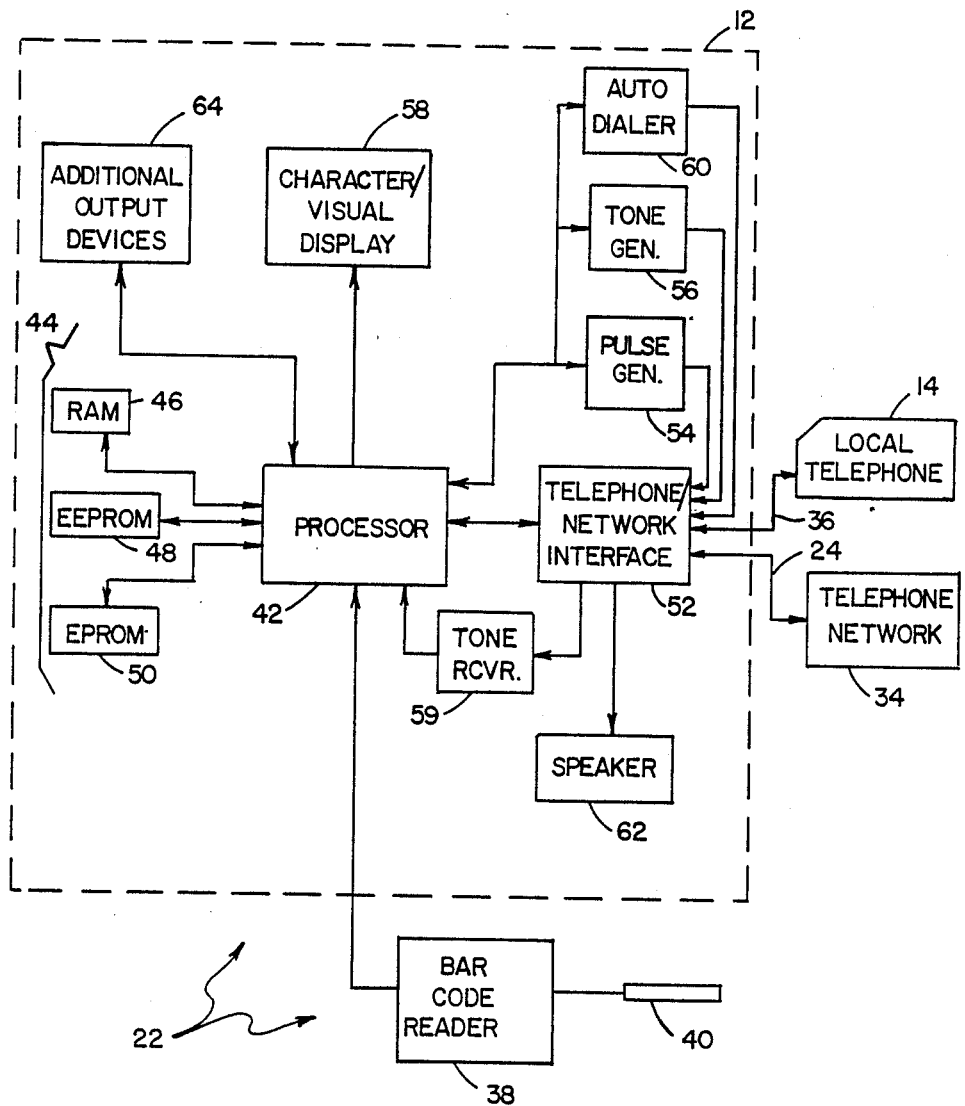
FIG. 3 is a detailed block diagram of the data transmission system of the present invention connected to a conventional telephone and telephone network.

Referring now to FIG. 3, there is shown a preferred embodiment of the telephonic bar code interface 22 for reading bar coded information, converting it to standard telephone signals and transmitting the signals over a telephone line 24 to a telephone network 34 which includes the connected telephone central office 20A. As preViously described, the telephone 14 may be connected to the telephonic bar code interface 22 via a standard modular cord 36. The components of the interface 22/data transmission system 12 are represented in block form since they are individually well known in the art, and to reproduce them in detail would only serve to increase the complexity of the explanation of the system 12 without adding to its clarity.

In its basic components, the bar code interface 22 includes means in the form of a bar code reader 38 and a bar code scanning device 40 for reading bar coded information and generating electrical signals representative thereof. Preferably, the bar code scanning device 40 connected to the reader 38 is a hand-held bar code scanning wand 28 as shown in FIG. 2; however, other devices, such as point-of-sale scanners commonly found in checkout counters, can also be used.

The system 12 includes means in the form of a processor 42 connected to the bar code reader 38 and a memory 44 connected to the processor 42. In response to the electrical signals generated by the reader 38 representing the bar coded information, such as a lottery ticket number, a telephone number, an invoice number or the like, the processor 42 and memory 44 cooperate to convert the signals to a computer usable form, such as conventional ASCII characters, the standard telephone communications format, and ultimately to telephone system recognizable signals, i.e., dual tone signals or dial pulse signals. The processor 42 per se is a suitable commercially-available microcomputer, such as an Intel 8031. The memory 44 is in the form of RAM 46. EEPROM 48 and EPROM 50, which likewise per se are conventional components.

Figure 4:
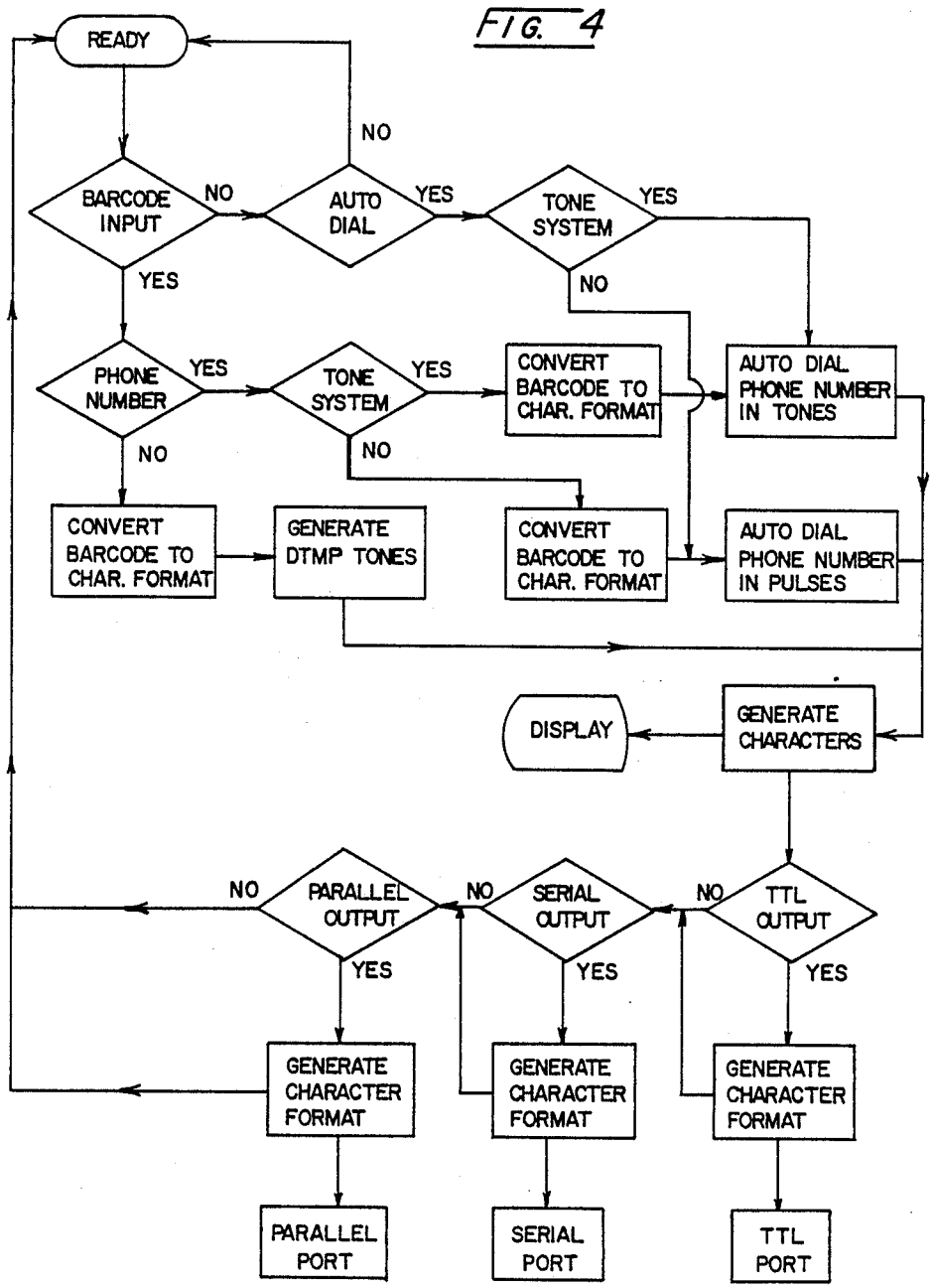
FIG. 4 is a flow chart illustrating the sequences of operational steps of the data transmission system in reading bar coded data and converting it to dual tone or dial pulse signals which are accepted by the telephone network or an interactive calling network, to perform verification of an instant lottery ticket.

An application program corresponding to the flow chart of FIG. 4 is stored in the programmable read only components (EEPROM 48 and EPROM 50) of the memory 44 and contains routines applicable to all commercially available bar code formats, for example UPC, EAN, JAN and the like. The appropriate routine in the application program is executable for encoding the electrical signals and converting the signals to the ASCII characters and ultimately to the telephone system recognizable signals. The processor 42 receives the electrical signals from the bar code reader 38 and accesses the memory 44 for causing execution of the application program for encoding the electrical signals and converting them to computer usable form, such as ASCII characters, and ultimately to telephone system recognizable signals.

The system 12 includes transmitting means in the form of a telephone/network interface 52, pulse generator 54 and tone generator 56 which are responsive to the processor 42 for converting the computer usable signals (or ASCII characters) to standard telephone signals (pulse or tone) for transmission on the telephone line 24. The pulse generator 54 causes transmission of the signals as dial pulses to the telephone line 24, whereas the tone generator 56 causes transmission of the signals as tones to the line 24. A first switch 57A is provided on the bar code interface 22 of FIG. 2 for activating one or the other of the generators 54, 56, and a second switch 57B is provided for controlling the on/off status of power to the unit.

Further, an LCD or LED display 58 is provided which is responsive to the processor 42 for displaying the computer usable signals (or ASCII characters). For a visible display of the signals generated by the processor 42, the application program transfers the ASCII characters to a character driver (not shown) to operate the LCD or LED display 58. A tone receiver 59 can also be provided for receiving information from the lottery host computer 16 or the interactive calling network 18. Such information can be used to update the system 12 or for display on the LCD or LED display 58 for communications with a person using the system 12 where no telephone is provided.

The data transmission system 12 receives power from a transformer (not shown) which can be plugged into an ordinary power outlet. While the system 12 is on, it constantly monitors the circuit for the presence of data from the bar code reader scanning device 40 or an auto dialer 60. As long as no such signals are present, the system 12 will not impede the normal use of the local telephone 14 attached to it. When input is present from the scanning device 40, and a dial tone connection has been established, the processor 42 executes the application program to encode the electrical signals from the bar code reader 38 and convert them to the appropriate computer usable characters, i.e., ASCII characters.

The activation of the auto dialer 60 by a button 61, see FIG. 2, on the bar code interface 22 directs the system 12 to retrieve stored data from the EPROM 50, the stored data corresponding for example to a two digit number entered on the keypad 23. Depending on the type of telephone service available, the application program then directs the data, converted or retrieved, to the appropriate generator, either the pulse generator 54 or the tone generator 56, for transmission over the available telephone service, to the connected telephone company central office 20A. The generated signals may be a telephone number utilized to establish communication with a compatible system or, for tone signals, may represent data which will be decoded by the receiving device, once communications have been established.

Also, a speaker 62 can be used by the system 12. Both incoming and outgoing voice or tone/pulse audible signals will be sounded through the speaker 62. Further, external communications ports for additional output devices 64, such as serial, parallel and TTL video devices, are provided. In many applications, it may be desirable to have a printer at the facility using the present invention such that a hard copy of transmitted data, for example a winning ticket validation, is available for the ticket agent. Available output devices are activated by the application program as required and supported by character and line driver circuits to generate the proper signal format and level.

The steps of the flow chart depicted in FIG. 4 which represent execution of the application program by the processor 42 of the system 12 are self-explanatory and thus need not be described herein in detail. Suffice it to say that the program distinguishes between the different information inputted to the system 12 and activates the appropriate one of the generators 54, 56 which is compatible with the particular telephone system. The appropriate one of the output devices 64 is selected concurrently as the converted information is displayed.

Having thus described the data transmission system of the present invention in detail and by reference to a preferred embodiment thereof, it will be apparent that certain modifications and variations are possible without departing from the scope of the invention defined in the appended claims.

What is claimed is:

1. A lottery agent data communications system for interfacing via a telephone system with a voice responsive instant lottery system, said data communications system comprising:
    means for reading a bar coded number and generating electrical signals representative thereof, said reading means including a bar code reader and a bar code scanning device connected to said reader;
    means responsive to said electrical signals generated by said bar code reader for converting said signals to telephone system recognizable signals;
    means responsive to said converting means for transmitting said telephone system recognizable signals into said telephone system; and
    means responsive to telephone system recognizable signals generated by the voice responsive instant lottery system and transmitted over said telephone system to said lottery agent data communications system, whereby said data communications system reads and transmits a bar coded telephone number to establish a connection to said voice responsive instant lottery system over said telephone system, reads and transmits a bar coded lottery ticket number to said voice responsive instant lottery system over said telephone system, and receives telephone system recognizable signals generated by said voice responsive instant lottery system to determine whether said bar coded lottery ticket is a winner.

2. The system of claim 1 wherein said scanning device is a hand-held bar code scanning wand.

3. The system of claim 1 wherein said converting means includes:
    a memory for storing an application program containing routines executable for encoding said electrical signals and converting said signals to a format recognizable by a telephone system; and
    a processor for receiving said electrical signals from said bar code reader and causing execution of said application program for encoding said electrical signals and converting them to said telephone system recognizable format.

4. The system of claim 1 further comprising:
    means responsive to said converting means for displaying said electrical signals.

5. The system of claim 1 wherein said transmitting means includes a pulse generator responsive to said converting means for causing transmission of dial pulses to the telephone line.

6. The system of claim 1 wherein said transmitting means includes a tone generator responsive to said converting means for causing transmission of tones to the telephone line.

* * * * *